US012493595B2

United States Patent
Nelson et al.

(10) Patent No.: US 12,493,595 B2
(45) Date of Patent: Dec. 9, 2025

(54) SYSTEMS AND METHODS FOR AUTOMATIC INDEX CREATION IN DATABASE DEPLOYMENT

(71) Applicant: MongoDB, Inc., New York, NY (US)

(72) Inventors: Cailin Anne Nelson, Boulder, CO (US); John Morales, Basking Ridge, NJ (US); Jonathan Balsano, New York, NY (US); Isabel Peters, Delray Beach, FL (US); Mark Porter, Seattle, WA (US)

(73) Assignee: MongoDB, Inc., New York, NY (US)

( * ) Notice: Subject to any disclaimer, the term of this patent is extended or adjusted under 35 U.S.C. 154(b) by 62 days.

(21) Appl. No.: 17/859,410

(22) Filed: Jul. 7, 2022

(65) Prior Publication Data

US 2023/0010652 A1    Jan. 12, 2023

Related U.S. Application Data (60) Provisional application No. 63/220,285, filed on Jul. 9, 2021.

(51) Int. Cl.
*G06F 16/22* (2019.01)
*G06F 16/27* (2019.01)

(52) U.S. Cl.
CPC .............. *G06F 16/22* (2019.01); *G06F 16/27* (2019.01)

(58) Field of Classification Search
CPC ................................ G06F 16/22; G06F 16/27
See application file for complete search history.

(56) References Cited

U.S. PATENT DOCUMENTS

| | | | |
|---|---|---|---|
| 10,379,943 B2* | 8/2019 | Borlick | G06F 3/0659 |
| 11,947,537 B1* | 4/2024 | Vig | G06F 16/24542 |
| 2007/0073761 A1* | 3/2007 | Anderson | G06F 16/22 707/999.102 |
| 2007/0288428 A1* | 12/2007 | Anderson | G06F 16/22 |
| 2008/0021872 A1* | 1/2008 | Borrillo | G06F 16/951 |
| 2010/0250504 A1* | 9/2010 | Balasubramanian | G06F 16/217 707/696 |
| 2018/0121494 A1* | 5/2018 | Antonopoulos | G06F 16/2365 |

OTHER PUBLICATIONS

[No Author Listed], Performance Advisor. MongoDB Atlas. Apr. 3, 2020. https://docs.atlas.mongodb.com/performance-advisor/ [Captured on Wayback Machine Dec. 7, 2022]. 3 pages.

* cited by examiner

*Primary Examiner* — Grace Park (74) *Attorney, Agent, or Firm* — Wolf, Greenfield & Sacks, P.C.

(57) ABSTRACT

In some embodiments, an auto-index system may be provided to determine one or more candidate indexes to be automatically created in a database system. The auto-index system may determine if one or more criteria associated with creating the one or more candidate indexes are met. In response to determining that the one or more criteria associated with creating the one or more candidate indexes are met, the auto-index system may automatically create the one or more candidate indexes, for example, by an automation agent. The one or more criteria may also be associated with respective performance metrics of the database system.

20 Claims, 5 Drawing Sheets

SYSTEMS AND METHODS FOR AUTOMATIC INDEX CREATION IN DATABASE DEPLOYMENT

CROSS-REFERENCE TO RELATED APPLICATIONS

This application claims the benefit under 35 U.S.C. § 119(e) of U.S. Provisional Application No. 63/220,285, entitled "SYSTEMS AND METHODS FOR AUTOMATIC INDEX CREATION IN DATABASE DEPLOYMENT," filed Jul. 9, 2021, the entire contents of which are incorporated herein by reference.

BACKGROUND

As distributed database deployments become more pervasive, and functionality suites become more expansive, management of distributed database systems becomes more challenging. Various issues can result from improper architecture, data design, and/or demands of distributed execution. Various conventional systems provide automated assistance and deliver pre-fabricated database deployments based on limited client input, while compromising the performance of the systems.

SUMMARY

In an embodiment, a database system may include at least one processor operatively connected to a memory, the at least one processor may be executed to determine a candidate index to be created in the database system; evaluate the candidate index to be created against one or more criteria associated with creating the candidate index to determine whether there is any negative impact on the database, and in response to determining that one or more criteria associated with creating the candidate index are met, automatically create the candidate index in the database system. In determining a candidate index, the at least one processor may monitor database operations and define one or more indexes which may improve database performance. The at least one processor may also recommend one or more indexes based on their respective impact scores or a combination of impact scores. In determining whether the one or more criteria associated with creating the candidate index are met, the at least one processor may determine whether one or more utilization metrics do not exceed respective threshold values. Examples of the one or more utilization metrics may include a CPU utilization, a machine load, a cluster load, a size of collection (e.g., a logical grouping of data units), a system memory utilization, and/or a time expected for creating the candidate index. Collections are logical groupings of base units of database data, and can include groupings of document-based data (e.g., in the known MongoDB database) as well as other data structures.

In response to determining that the one or more criteria or all of the criteria are met, the at least one processor may automatically create the candidate index, for example, using an automation agent. An automation agent may be a process, daemon, and/or computer program that can be executed as part of a database management suite/system. The automation agent can be executed as a background process, such as a daemon, and can receive requests (e.g., for creating an index) and process requests in the background according to default settings or user supplied parameters. The automation agent can be configured to execute database management functions (e.g., index creation) without interfering with other database operations and without user intervention. Creating an index may be performed in an index build process.

Additionally, and/or alternatively, the at least one processor may determine whether creating the candidate index may interfere with one or more processes currently in progress. In response to identifying the one or more processes that may be interfered by creating the candidate index, the at least one processor may suspend automatically creating the index until the one or more processes are completed.

Additionally, and/or alternatively, the at least one processor may enable a user to enable/disable auto-index, for example, via a user interface. The user interface may also enable the user to maintain an excluded list of indexes. The at least one processor may determine whether a candidate index to be auto-created matches an index in the excluded list. In response to determining that the candidate index to be auto-created matches an index in the excluded list, the at least one processor may determine not to create the candidate index.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Indexing is a common database technology to speed up search operations in a database deployment. An index is a special data structure containing data of certain fields of documents in the database and a reference that points to the data source (e.g., document(s)) from which the index was created. An index may contain an index table (or other data structure) that stores multiple indexes. When a user queries the database, instead of searching all of the documents in the database against the query, the database searches the indexes in the index table for a match. When an index is matched to the query, the reference associated with the matched index enables the system to quickly find the data source without expensive searching throughout the database. Thus, the speed of search operations in the database deployment may be improved.

The inventors have recognized and appreciated that indexing is particularly important in improving the performance of a database system. For example, in a search operation, if a search term in a query is not indexed in the database, the system may need to search through the database to find the matching data source, and thus, the performance of the database is degraded. On the other hand, if an index table contains too many indexes that are never used in search operations, it may be a waste of system resources, which may also degrade the performance of the database system.

The inventors have recognized and appreciated that conventional systems allow automatic creation of indexes in certain scenarios. For example, when a system experiences a sudden performance degradation due to occurrence of an unindexed query or a change in traffic pattern to an unindexed route in an application, the system may reactively create a new index automatically. This technique, however, may inadvertently impact the performance of the system. For example, the newly created index may have appeared only once and is not used again. As such, the new index will not benefit any future searches. Further, the automatic creation of indexes may consume system resources, and thus, compete for resources with other utilities in the system, resulting in performance degradation of the system.

Accordingly, the inventors have developed new techniques to improve an auto-index system in database deployments, where the new techniques determine what index(es) to create, when to create the index(es), and how to create the index(es). For example, an auto-index system is provided that is configured to determine a candidate index to be automatically created in a database management system. The auto-index system may determine whether to automatically create the candidate index in the database management system by evaluating the candidate index to be created against one or more criteria associated with creating the candidate index and determining whether one or more criteria are met. In response to determining that one or more criteria are met, the auto-index system may proceed to automatically create the candidate index.

In some examples, the one or more criteria may be associated with whether creating an index may have a negative impact on the performance of the database management system. For example, the auto-index system may determine whether any metrics of CPU utilization, machine load, cluster load, collection size, system memory utilization and/or the time of build expected to be required for creating the index exceed a respective threshold value. In response to determining that one or more of the above metrics do not exceed respective threshold values, the auto-index system may determine that one or more criteria associated with creating the index are met. In response to determining that one or more of the criteria are met, the auto-index system may proceed with creating the index, for example, cause an automation agent to automatically create the index without user intervention.

In some embodiments, before proceeding with creating a candidate index, the auto-index system may additionally assess whether one or more additional criteria associated with creating the index are met. In response to determining that the one or more additional criteria are met, the auto-index system may proceed with creating the candidate index. For example, the candidate index may be created as a secondary index (an index other than the primary index, where a primary index may be a default index, e.g., a unique index on the _id field which is a primary key for a collection, and every document must have a unique _id field). The auto-index system may check a threshold number indicating the maximum number of secondary indexes the auto-index system can create, and determine whether the expected number of indexes to be created (including the candidate index) is below the threshold number. In response to determining that the expected number of secondary indexes is below the threshold number, the system may determine that a corresponding criterion associated with the secondary index number is met.

In some embodiments, the auto-index system may determine whether there are any replication health issues in a database cluster, such as whether there are performance issues reported from flow control metrics or other monitoring tools in the database management system. A database cluster may be a replica set or a sharded cluster, and may be used to refer to a part of database deployment. A database deployment may have multiple datasets in different collections and databases internally. A database cluster may have a plurality of cluster tiers, each tier may have one or more clusters, where each cluster tier may dictate a respective memory and storage space. An example of replication health issue in a database cluster may be that replication lag exceeds a threshold time, when secondary node(s) in a replica set cannot replicate data fast enough to keep up with the rate that data is being written to the primary node(s). In some examples, the threshold time may be determined based on a historical average lag from past replication operations. In response to determining that there are no replication health issues, the auto-index system may determine that a corresponding criterion associated with replication health is met. In response to determining that the one or more additional criteria are met, the auto-index system may proceed with creating the candidate index, for example, cause an automation agent to automatically create the index.

In some embodiments, the auto-index system may include a user interface that enables a user to enable/disable the auto-index function. For example, the auto-index system may determine whether auto-indexing is enabled for a database cluster before determining the candidate index. In some examples, the auto-index system may allow a user to maintain an excluded list which contains indexes not to be created. In such case, upon determining a candidate index, the auto-index system may determine whether the candidate index matches any index in the excluded list. In response to determining that the candidate index matches an index in the excluded list, the auto-index system may determine not to proceed with creating the index.

Additionally, and/or alternatively, the auto-index system may also determine when auto-creation of an index may be started by the automation agent. For example, the auto-index system may determine that the candidate index be created instantly, and subsequently cause the automation agent to start. In another example, the auto-index system may determine whether the creation of an index may have a negative impact on or interfere with other processes (e.g., an auto-scaling process) in progress. In response to determining that such other processes are in progress, the auto-index system may suspend the creation of the new index (e.g., by not starting the automation agent) until these processes of concern are completed.

The various embodiments described are advantageous over conventional database systems in that improved index hygiene of a database system is automatically maintained with minimal user intervention and/or management. Further, various embodiments avoid the issue presented in conventional systems and/or reactive indexing that may result in degradation of performance of the database system. Various improvements in database deployments provided are particular useful for database systems designed for small and medium-sized customers with no dedicated database administrator (DBA) team. Selectively engaging in automatic indexing also benefits users and engineers with minimal or no specialized knowledge of managing databases.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

Figure 1:
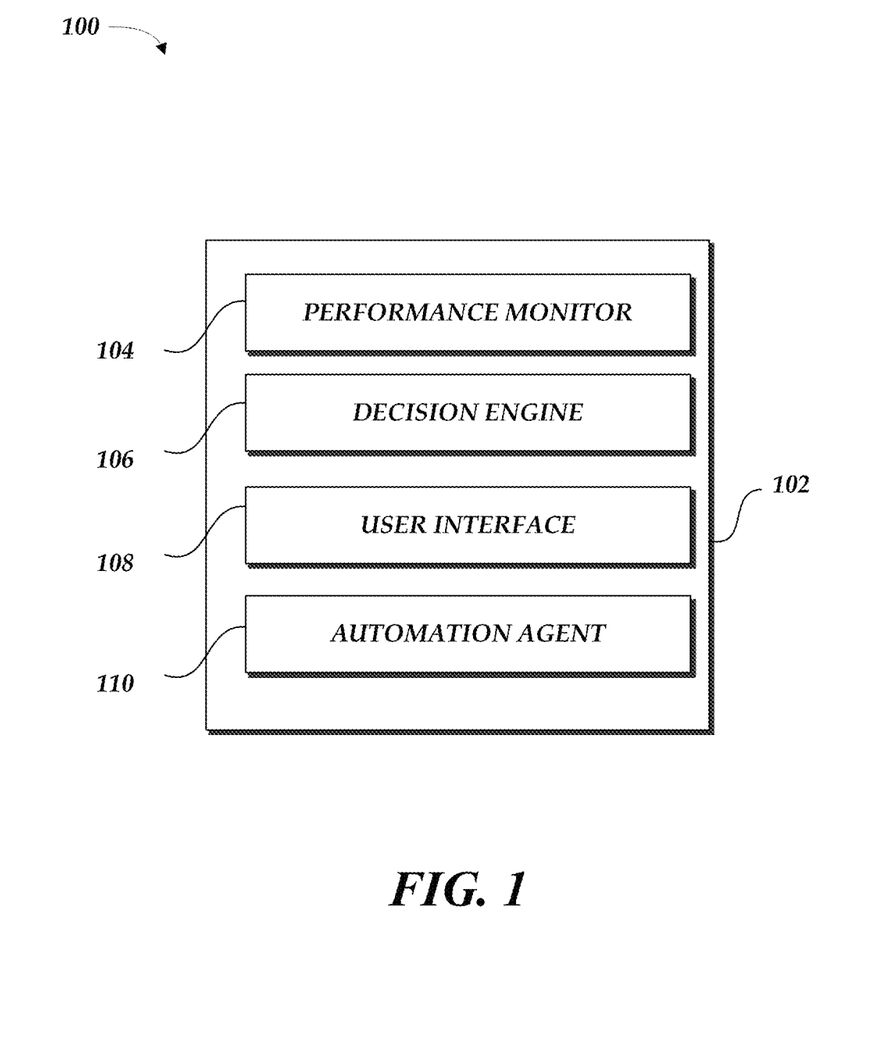
FIG. 1 is block diagram of an example auto-index system, according to some embodiments disclosed herein.

FIG. 1 is block diagram of an example database management system, according to some embodiments disclosed herein. Database management system 100 can include an auto-index system 102 configured to execute various components of the system 100. In other embodiments and/or alternatives, the auto-index system 102 can execute the functions described herein associated with the database system. In other implementation and/or alternatives the system 100 can execute any of the functions associated with the database management system without instantiation of the auto-index system 102 and/or specific components.

According to one embodiment, system 100 can be executed as a cloud-based service and/or integrated into a cloud-based database deployment. For example, system 100 can be integrated into a database, or include a database, as a service offering, and the system 100 can monitor operation of the database, calls, data access requests, etc., to improve the operation of the database. In some examples, integration can include access to database metadata, including configuration and/or architecture information that can be analyzed to determine optimization issues.

In further embodiments, system 100 can also be executed in the context of an on-premises database deployment. In on-premises deployments, the database system and the hardware to support it are typically located at a client location and the client is responsible for the associated hardware. The database system can be integrated into the on-premises deployment, or called from the on-premises systems as a service. Still other embodiments can include on-premises and cloud-based components.

According to various embodiments, system 100 and/or auto-index system 102 can include a performance monitor 104 and a decision engine 106. In some embodiments, performance monitor 104 may be configured to recommend one or more indexes to be auto-created. The performance monitor 104 can be configured to run in the background. The performance component 104 may be configured to deliver detailed metrics on data access requests (e.g. read, write, new, etc.), index usage, lack of index, identify complex data structures, identify lack of complex data structures, etc., among other options. In some embodiments, the performance monitor 104 can be run on request, for example, as an on-demand service. In yet other embodiments, the performance monitor can be scheduled to run at certain times and/or based on certain conditions (e.g., time of day, percent utilization of the database, volume of requests to the database, excessive usage threshold, etc.).

In some embodiments, performance monitor 104 may be configured to monitor the database operations (e.g., queries) and recommend one or more indexes to be auto-created. For example, the performance monitor may identify slow queries and suggest new index(es) to improve the query performance. In some embodiments, the performance monitor may be configured to recommend creation of an index in response to meeting one or more criteria. For example, performance monitor 104 of system 102 may identify indexes that may have an impact score above a threshold score. An impact score may be a metric that indicates a degree of impact an index may have on one or more components in the database system (e.g., system 100). For example, if an index has an impact on the user interface (UI), the index may have a high impact score. In some examples, an impact score associated with an index may indicate a prediction of the percentage reduction in total operation latency if the index is created. For example, a 10% impact score may indicate that, if the index were to be created, an average reduction in operation latency for the database cluster is predicted to be 10%, assuming all else is equal. According to some embodiments, historic analysis of database performance metrics enables the system to generate an estimate of an effect on operation latency for projected workloads. In one example, the system estimates the effect induced by an index build at various times to determine if thresholds are exceeded. Another example would be to determine if creating the index would have a significant impact on lowering wasted disk IO. In response to determining that the index has an impact score exceeding the threshold score, the performance monitor may recommend the index to be created. An example threshold score may be 5%, 10%, or any other suitable threshold.

Additionally, and/or alternatively, system 102 may also determine the execution count covered by an index. For example, the execution count may include the frequency of operations covered by the index (e.g., the number of times the operations (e.g., queries) may run per period of time (e.g., per hour)). In such a way, the performance monitor may determine whether or not the index may have a high impact. For example, in response to determining that an index covers operations (e.g., database queries) that run more than a threshold number of times per hour, the performance monitor may recommend the index to be created.

In some embodiments, the performance monitor may recommend indexes based on other performance statistics, such as the average execution time (the current average execution time of queries that would be affected by the recommended index), the average query targeting score (average number of documents read per document returned by affected queries. A higher query targeting score indicates a greater degree of inefficiency), or the in memory sort score (the current number of affected queries per time period, e.g., per hour, that needed to be stored in memory).

It is appreciated that the performance monitor may recommend index(es) based on one or more criteria disclosed herein, or a combination thereof. For example, the performance monitor may determine a combined impact scored based on one or more criteria and evaluate the combined impact score against a threshold score. If the combined impact score exceeds the threshold score, the performance monitor may recommend the index(es). In some embodiments, the performance monitor may rank a plurality of indexes based on respective impact scores of the indexes, and select top indexes (having higher impact score) to recommend, while not recommend inefficient indexes (having lower impact score).

The decision engine 106 may be configured to make determination whether an index should be automatically created. In some embodiments, decision engine 106 may obtain the recommended index(es) from the performance monitor. For example, the performance monitor may identify the data records of indexes that have appeared in a past time period (e.g., past 6 hours, or other suitable time period). Thus, decision engine 106 may periodically access the performance monitor for recommended index(es), which are candidate index(es) to be created. As described further herein, decision engine 106 may be configured to make decisions as to whether the recommended index(es) from the performance monitor should and could be created.

System 100 and/or auto-index system 102 may also include a user interface 108. For example, user interface 108 may enable a user to enable/disable index auto-creation (e.g., turn on/off auto-index function). The user interface may also allow a user to maintain an excluded list for index auto-creation to prevent any index in the list from being created automatically by the system. System 100 and/or auto-index system 102 may also include an automation agent 110 configured to implement various automated tasks, such as index creation. Various components of system 100 and/or auto-index system 102 are described in detail further herein.

The inventors have recognized and appreciated that index creation may degrade the performance of the database system. In particular, an auto-creation of a large number of indexes may significantly degrade the performance of the database system. Accordingly, in some embodiments, the auto-index system may select a threshold number of indexes for auto-creation per collection. The performance monitor may determine an expected number of potential recommended indexes for auto-creation, and compare the expected number with a threshold number. In response to determining that an expected number of potential recommended indexes exceeds the threshold number, the performance monitor may stop recommending any new indexes to be auto-created.

The inventors have recognized and appreciated that creating (building) indexes may potentially cause a database cluster in a database system to fail-over because the build process may consume system resources. In a database cluster having a replica set, a fail-over may occur when a primary node in the replica set fails (or does not respond within a threshold time period), in which case a secondary node may take the responsibility of the primary node such that normal database operations can be resumed. Accordingly, in some embodiments, system 102 may include decision engine 106 configured to check the performance monitor at a schedule, for whether an index needs to be created. For example, indexes may be recommended (e.g., by the performance monitor 104) per each cluster of a plurality of clusters in a database. In some examples, indexes may also be recommended per cluster tier. The decision engine 106 may check each cluster/tier at a regular time interval, e.g., every six hours, or other suitable time intervals.

In some embodiments, if a cluster is eligible for auto-indexing (e.g., auto-indexing is enabled by a user), the auto-index system may query the performance monitor 104 for recommended index(es) to be created. In some examples, the query may be run on a schedule for recommended indexes, or at low utilization times, among other options. In one example, the decision engine 106 may query and retrieve recommended indexes for the cluster from performance monitor 104 at every 6 hours, or any other suitable time intervals.

In some embodiments, in response to retrieving the recommended index(es) for a given cluster, the decision engine 106 may evaluate the recommended (candidate) index(es) to be created against one or more criteria associated with creating the index(es), and determine if one or more of these criteria are met. In response to determine that one or more of these criteria or all of the criteria are met, system 102 may submit an index creation job for an automation agent 110. Automation agent 110 of system 102 may proceed with automatically creating the index without user intervention.

In some embodiments, the inventors have recognized and appreciated that index build may negatively impact cluster performance (during or after the build), thus, in some embodiments, the decision engine 106 may determine whether a negative impact on the performance of the cluster may arise from automatically creating the indexes. For example, decision engine 106 may determine the negative impact based on whether one or more criteria associated with auto-creating an index are met, where the one or more criteria may be associated with utilization metrics. Examples of utilization metrics include a CPU utilization, a machine load (e.g., IO load), a cluster load, a collection size, a system memory utilization, and/or a time expected for creating an index. For example, in determining the expected time for creating an index (build time), a number of factors, such as the size of the data being indexed and the number of keys being index, may be considered.

For each of these utilization metrics, the threshold value may be associated with system resource utilization in a past time period. For example, decision engine 106 may determine whether an estimated system resource utilization (e.g., CPU utilization) associated with creating an index is above an average system utilization (e.g., normalized CPU utilization relative to non-burst capacity) in a time period in the past (e.g., 15 minutes, or any other suitable period) by a threshold percentage. Examples of threshold percentage may include 50%, 25%, 75% or any other suitable percentage. In a non-limiting example, in response to determining that an estimated CPU utilization associated with creating a new index is above 50% of CPU utilization in the past 15 minutes, decision engine 106 may determine that a criterion corresponding to CPU utilization is not met. Conversely, in response to determining that the estimated CPU utilization associated with creating the new index is below 50% of CPU utilization in the past 15 minutes, decision engine 106 may determine that the criterion corresponding to CPU utilization is met.

In another non-limiting example, decision engine 106 may determine whether a memory utilization associated with creating a new index is above certain threshold, e.g., 80% over memory utilization in the past 15 minutes. In response to determining that the memory utilization for creating the index is below the threshold, decision engine 106 may determine that a corresponding criterion associated with memory utilization is met. In another non-limiting example, decision engine 106 may estimate the time the index creation will take. In doing so, the auto-index system may estimate the size of the index (or multiple indexes that are recommended) and use the estimated size to determine the expected operational time required for creating the index(es). In some examples, the auto-index system may use the collection size as a proxy in determining whether the estimated time for index build is above a threshold time. In response to determining that the time for index build is below a threshold time, decision engine may determine that a corresponding criterion associated with the time to build the index is met.

Further embodiments are configured to evaluate whether the system should automatically create index structures in association with creating a candidate index. For example, the system can be configured to evaluate secondary index creation under similar constraints as for the indexes described above. In creating secondary indexes, the system may invoke additional constraints in addition to, for example, performance metrics, utilization, etc. In some embodiments, the one or more criteria associated with creating a candidate index may be associated with a maximum number of secondary indexes as permitted by the auto-index system or the database deployment, inclusive of user-created and auto-created indexes, for a single collection. For example, decision engine 106 may determine an expected number of secondary indexes from creating the recommended index, among all namespaces per single collection, if no other index build is in progress. Namespace is the canonical name for a collection or index. For example, the namespace is a combination of the database name and the name of the collection or index. In response to determining that the expected number of secondary indexes is below a threshold number, decision engine 106 may determine that a corresponding criterion associated with secondary index is met; otherwise, decision engine 106 may determine the corresponding criterion is not met. When the criterion is not met, the decision engine 106 may determine not to create the recommended index. According to one examples, the system may be configured to limit the number of secondary indexes to one per namespace within a cluster.

In some embodiments, the one or more criteria may be associated with performance of a database cluster or a portion of the cluster (e.g., a node in a replica set, or a cluster tier). For example, the performance may include replication health of a database. Examples of replication health may include flow control metrics, replication lag etc. Replication lag is a measure of how long replication operations take to propagate in the database (e.g., propagating data from primary node(s) to secondary node(s) in a replica set). Determining replication lag associated with creating a new index provides information on when/if creating a new index may have a negative impact on the performance of the database, in which case, the decision engine 106 may respond with not creating any new indexes.

In a non-limiting example, if any portion of the database has performance problems, it may issue flow control messages to inform the rest of the cluster about the performance problems. Thus, in responding to receiving a flow control metric indicative of performance issues with a node in the cluster, decision engine 106 may determine that a corresponding criterion associated with replication health is not met. Conversely, in responding to receiving no flow control metric indicative of performance issues with any node in the cluster, decision engine 106 may determine that the corresponding criteria associated with replication health is met. In another example, decision engine 106 may determine whether a replication lag associated with creating an index exceeds a threshold time (e.g., a few seconds). In response to determining that the replication lag exceeds the threshold time, decision engine may determine that a corresponding criterion is not met, and thus determine to not create the index.

In some embodiments, system 102 may include a user interface (UI) 108. The user interface 108 may include a provision for user to enable/disable auto indexing. For example, system 102 may receive, through an UI, user selection indicative of whether auto indexing is enabled/disabled. In another example, system 102 may query, for example, through an API in the system 100 and/or system 102 an indicator that is indicative of whether auto indexing is enabled/disabled. In another example, the auto-index system may access a configuration page, e.g., a cluster creation page to configure or retrieve data containing an indication on whether auto indexing is enabled/disabled.

In some embodiments, user interface 108 may be coupled to the decision engine 106 and configured to display the candidate (recommended) index(es) to be created. Some embodiments may display information on the criteria that was evaluated for the respective index(es) to be created. In the embodiments described above, if an index is recommended by performance monitor 104 but is prevented from being created because the one or more criteria are not met, system 102 may display in the UI 108 information about the recommended index that was not created, and/or the conditions on the cluster that did not meet the one or more criteria. Additionally, and/or alternatively, the auto-index system may send an email to the user with the conditions that were evaluated. For example, the auto-index system may send an email to the user with the conditions on the cluster that did not meet the one or more criteria.

In some embodiments, UI 108 may receive data containing a user indication on whether one or more indexes recommended by the performance monitor 104 should not be auto-created. In some embodiments, the user interface may facilitate the user to override creation of the recommended indexes. For example, the recommended indexes may include some older or redundant indexes, and such UI may allow the user to prevent those recommended indexed from being auto-created.

The various embodiments described above may include respective default threshold values for one or more criteria checked by decision engine 106. Additionally, and/or alternatively, each cluster may include a configuration document. For example, a configuration document may be created per cluster when a user enables auto indexing. Each configuration document may contain a set of optional fields for thresholds that, when set, will overwrite the default thresholds for the decision engine. This allows configuring cluster limits individually. Additionally, and/or alternatively, UI 108 may include one or more widgets (e.g., knobs) that enable a user to adjust the respective threshold values at cluster level. In other embodiments, the default threshold values can be optimized. For example, the default threshold values may be empirical values set by the user.

In some embodiments, once the index creation (build) is started, the new index may be created with metadata indicating that the index was auto-created. For example, the new index may be named with tag that indicates it is auto-created. In a non-limiting example, a new index may be named following the standard combination of key and direction with an auto-created postfix, e.g., key1_1_key2_1_autocreated. This will help identifying indexes that were auto-created (e.g. to tag them in the UI). While an index is to be created, or when an index is being built or after an index is built, system 102 may communicate the status of the build with a user device (e.g., via user interface 108), including alerting the user(s) (e.g., those users with GROUP_OWNER permissions). For example, an email will be sent to the user when an index build has started (the agent job was submitted) and/or when an index build finishes. Additionally, and/or alternatively, the namespace associated with the index may be included in the email. In some examples, the index will not be recorded in the email. The email will contain a link to an index stats page in the UI.

Figure 3A:
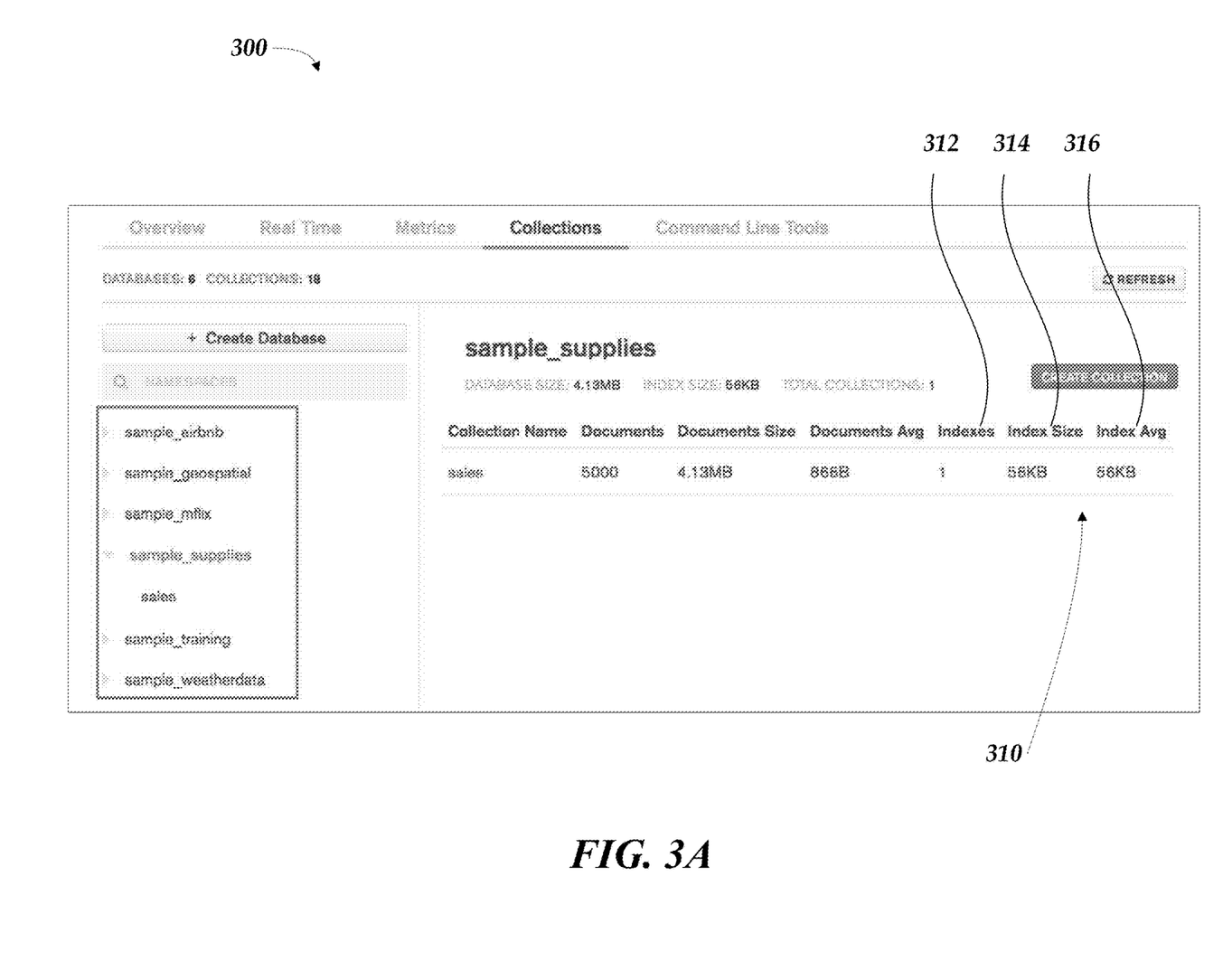
FIGS. 3A-3B illustrate screen shots of example graphical user interfaces showing index information, according to some embodiments.
Figure 3B:
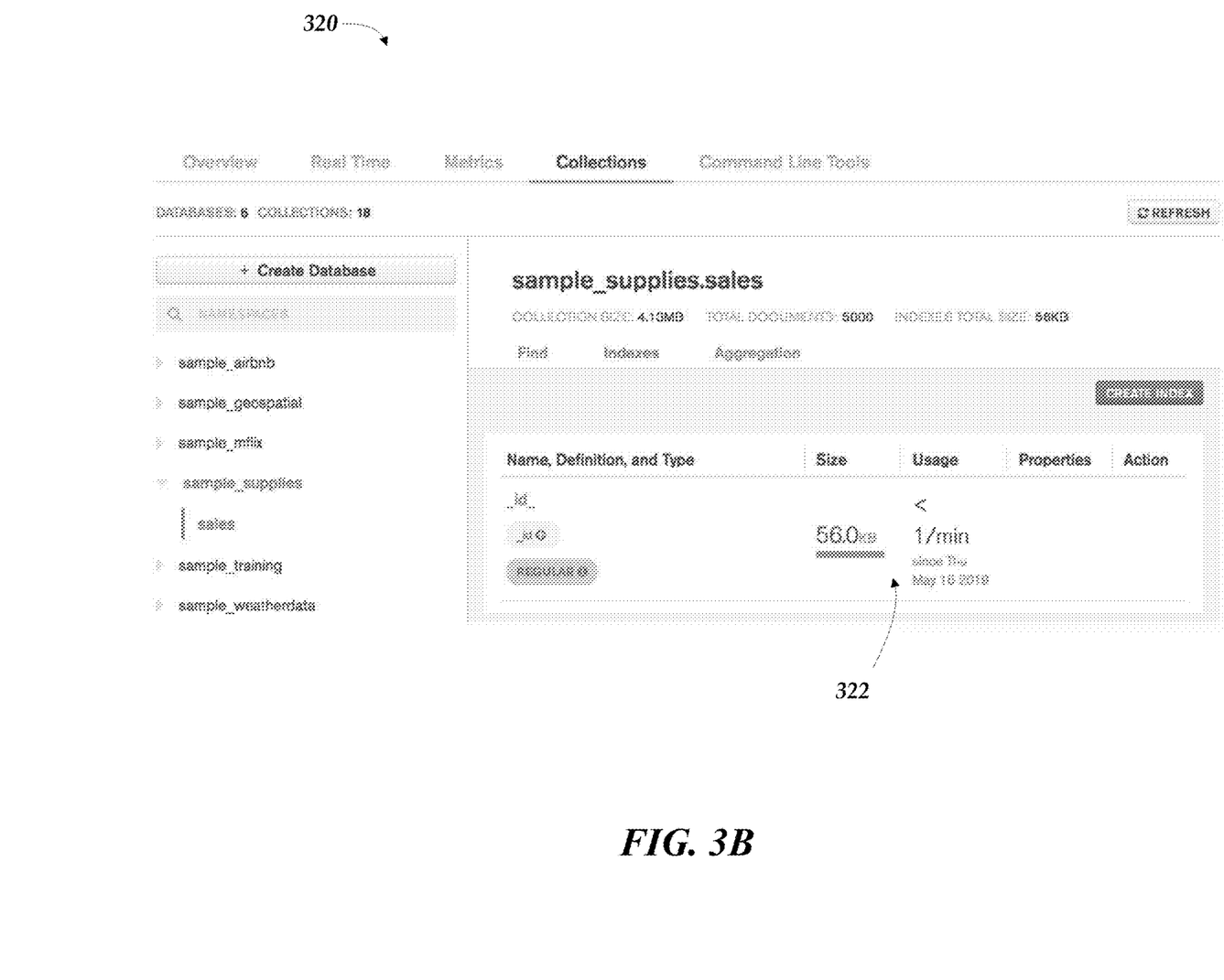

FIGS. 3A-3B illustrate screen shots of example graphical user interfaces showing index information, according to some embodiments. For example, FIG. 3A illustrates a screen shot of an example graphical user interface 300, which shows index statistics for a given collection. As shown, the index statistics 310 may include the number of indexes 312, the index size 314, and the average index size 316. FIG. 3B illustrates a screen shot of an example graphical user interface 320, which shows detailed information 322 of an index.

In some examples, an email will be sent to the user when an index fails to be created or when an index build is stalled. In some embodiments, an audit trail will be created for the start and completion of an index build. The audit will be displayed in an activity feed and will contain specifics on the namespace and the index.

In some embodiments, system 102 may persist metadata in a new collection for the clusters that have auto-indexing enabled. For example, the system 102 may persist excluded indexes that a user does not want to auto-create in the future on a particular cluster as well as a list of indexes that were auto-created in the past for tracking and debugging purposes. Indexes that were auto created may be marked with a tag (e.g. in user interface 320, FIG. 3 Ban "Auto-Created" tag may be displaced next to each index) in the Indexes section of the collection. When a user does not want an index to be auto created, the index will be added to an excluded list to prevent the auto-index system from automatically re-creating this index in the future. In some embodiments, excluded indexes will be displayed in the UI 108.

The UI will inform the user about consequences of dropping an index, whereas the user can still manually create the index. In some examples, once an index has been excluded by a user, that index may not be removed from the excluded list. Additionally, and/or alternatively, an index that has been excluded by a user will not be reconsidered for auto-creation. For example, the auto-index system may determine whether a candidate index matches any index in the excluded list. In response to determining that index matches an index in the excluded list, the auto-index system may determine not to create the candidate index. Alternatively, an excluded index may be removed manually from the metadata document in order to be eligible again for auto-creation.

In some embodiments, once an index is auto-created, the auto-index system 102, or another component in the database management system 100 (FIG. 1) may track auto-created indexes metrics to use them for analytics, performing AB testing and success/performance measurement.

The inventors have recognized and appreciated that certain risks may arise as indexes are automatically created, which may negatively impact the performance of the database system. For example, there is a risk of automatic index build interfering with other processes, such as auto-scaling. Accordingly, the auto-index system described herein may additionally identify other processes that could be interfered by creation of a new index and suspend the creation of the new index until the processes of concern are completed. For example, indexes for auto-creation may be built only after a cluster has been auto-scaled. If an auto-scaling process is in progress, an index build can be skipped and performed in the next iteration. In these embodiments, auto-scaling and auto-creation may not be triggered at the same time.

It should be appreciated that various examples above each describe functions that can be and have been incorporated in different embodiments together. The examples and described functions are not exclusive and can be used together. For examples, various functions in performance monitor 104 may also be implemented in decision engine 106. In a non-limiting example, decision engine 106 may be configured to determine a candidate index for auto-creation, e.g., suggest an index to be automatically created. In other examples, various operations described herein may be implemented in the auto-index system (e.g., 102 in FIG. 1). Additionally, and/or alternatively, some operations described herein may also be implemented in other components or sub-system of the database management system (e.g., 100 in FIG. 1). Modifications and variations of the discussed embodiments will be apparent to those of ordinary skill in the art and all such modifications and variations are included within the scope of the appended claims.

Figure 2:
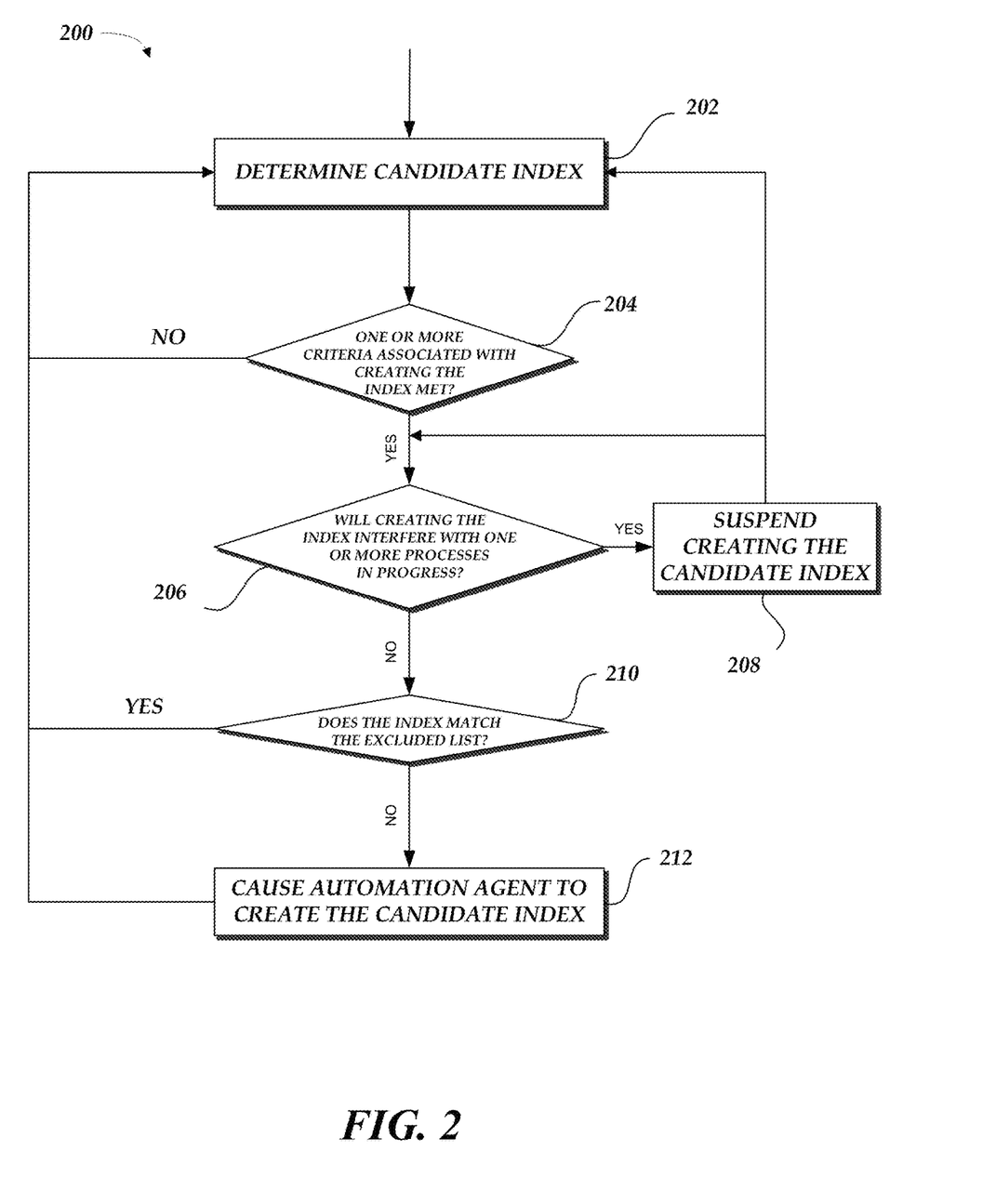
FIG. 2 is a flow chart showing an exemplary computerized method for performing auto-index operations according to some embodiments.

FIG. 2 is a flow chart showing an exemplary computerized method 200 for performing auto-index operations according to some embodiments. Method 200 may be implemented in one or more components of the auto-index system 102 and/or database management system 100 (see FIG. 1). For example, any of the acts in method 200 may be performed by a suitable component of the auto-index system 102 (in FIG. 1). In some embodiments, method 200 may include determining a candidate index to be created in a database system, at act 202. As described herein, the index (es) to be created may be recommended by the performance monitor (e.g., 104 in FIG. 1) by evaluating one or more impact scores. Method 200 may further evaluate the candidate index to be created against one or more criteria associated with creating the candidate index, at act 204. For example, act 204 may determine whether one or more criteria associated with creating the candidate index are met, to determine whether creating the candidate index will have any negative impact on the performance of the database. The one or more criteria may be associated with metrics of CPU utilization, machine load, cluster load, collection size, system memory utilization and/or the time of build expected to be required for creating the index. In response to determining that the one or more criteria associated with creating the index are met (at act 204), method 200 may proceed, for example, causing an automation agent to create the candidate index at act 212. As described in the present disclosure, in determining whether the one or more criteria are met, act 204 may determine whether the one or more of the above metrics do not exceed respective threshold values. If the one or more metrics do not exceed respective threshold values, method 204 may determine that the one or more criteria are met at act 204. Otherwise, method 200 may return to act 202 to process other index(es).

In some embodiments, before causing the automation agent to create the candidate index at act 212, method 200 may further determine whether creating the candidate index will interfere with one or more processes in progress, at act 206. If it is determined, at act 206, that creating the index will interfere with one or more processes that are currently in progress (e.g., an auto-scaling process), method 200 may suspend automatically creating the candidate index at act 208, until the one or more processes currently in progress are completed. At that time, method 200 may proceed with causing the automation agent to create the index, at act 212. Alternatively, or additionally, in response to determine the one or more processes of concern at act 206, method 200 may not wait until the one or more processes of concerns are completed. Instead, method 200 may return to act 202 to process other index(es). In some embodiments, checking and waiting for the one or more processes of concern may be performed by another process, e.g., as part of the automation agent (e.g., 110 in FIG. 1) or other agent(s).

In some embodiments, before causing the automation agent to create the candidate index at act 212, method 200 may further determine whether the candidate index to be created match an excluded list at act 210. The excluded list may include a list of index(es) that are not to be created. In some examples, the excluded list may be configured by the user. In response to determining that the index to be created does not match any index in the excluded list, method 200 may proceed to causing the automation agent to create the candidate index, at act 212. Otherwise, method 200 may return to act 202 to process other index(es).

It is appreciated that the operations in method 200 may be performed by any suitable component in the auto-index system (e.g., 102 in FIG. 2). For example, act 202 may be implemented in a performance monitor (e.g., 104 in FIG. 1). Acts 204, 206, 208 may be implemented in any of decision engine (e.g., 106 in FIG. 1), and/or performance monitor (e.g., 104 in FIG. 1). Additionally, and/or alternatively, any of the acts 202 to 210 may be coupled to the user interface (e.g., 108) of the auto-index system to retrieve data (e.g., excluded list used in act 210) and/or perform other user interactions.

Figure 4:
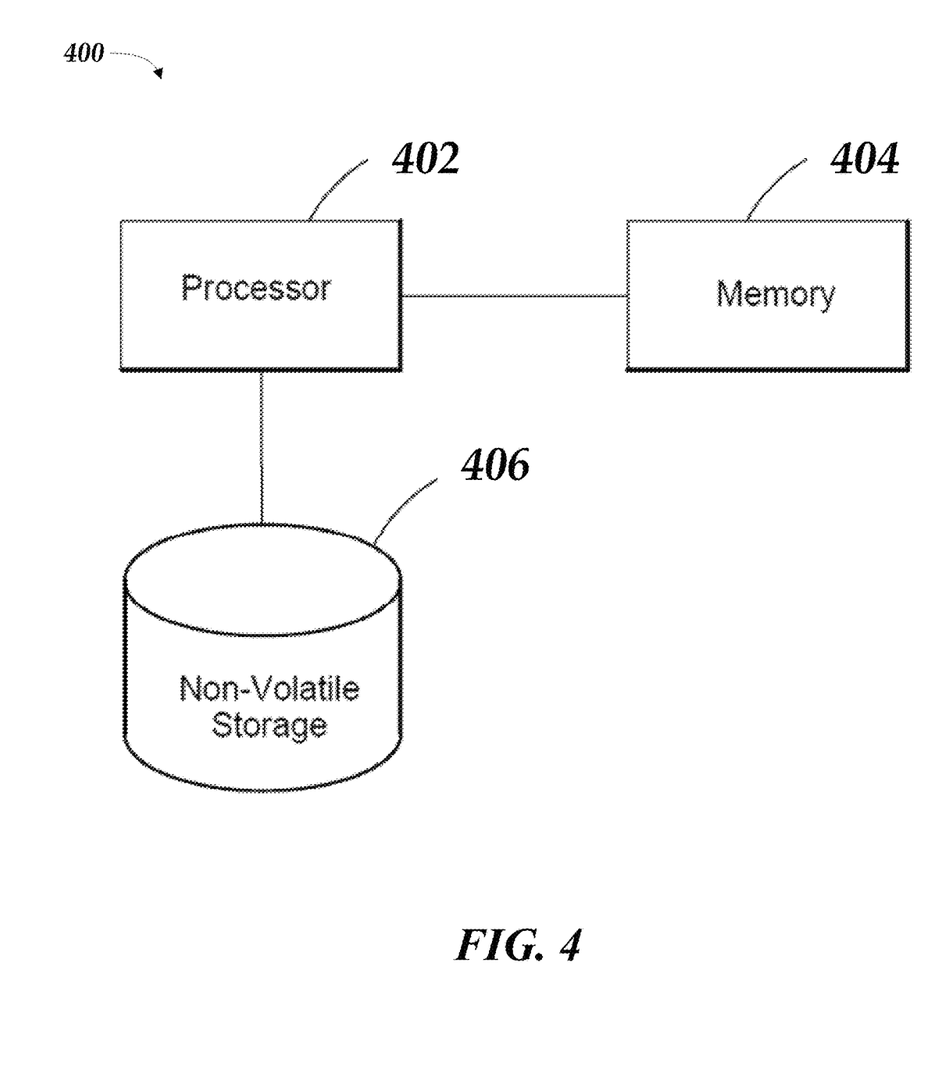
FIG. 4 is an example block diagram of a special purpose computer system that can improve over conventional systems based on implementation and/or execution of the functions discussed herein.

An illustrative implementation of a computer system 400 that may be used in connection with any of the embodiments of the disclosure provided herein is shown in FIG. 4. The computer system 400 may include one or more processors 402 and one or more articles of manufacture that comprise non-transitory computer-readable storage media (e.g., memory 404 and one or more non-volatile storage media 406). The processor 402 may control writing data to and reading data from the memory 404 and the non-volatile storage device 406 in any suitable manner. To perform any of the functionality described herein, the processor 402 may execute one or more processor-executable instructions stored in one or more non-transitory computer-readable storage media (e.g., the storage media 406), which may serve as non-transitory computer-readable storage media storing processor-executable instructions for execution by the processor 402.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to figures and functions above, the various system components, analysis algorithms, processing algorithms, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. An auto-index system comprising:
    at least one processor operatively connected to a memory, the at least one processor when executing configured to:
        determine a candidate index to be created in a database system; and
        evaluate one or more metrics associated with resources to be used for creating the candidate index to determine whether one or more criteria associated with creating the candidate index are met;
        in response to determining that the one or more criteria associated with creating the candidate index are met, automatically create the candidate index in the database system; and
        before execution of operations to automatically create the candidate index:
            identify one or more processes already in progress or going to be in progress at a start of the operations to automatically create the candidate index prior to automatically creating the candidate index;
            determine whether creating the candidate index negatively impacts performance of the database system by determining whether creating the candidate index interferes with the one or more processes; and
            in response to determining that creating the candidate index negatively impacts performance of the database system including the one or more processes, suspend the start of the operations to automatically create the candidate index until the one or more processes are completed.

2. The system of claim 1, wherein the at least one processor is configured to determine the candidate index to be created based on one or more impact scores, each impact score associated with a respective impact on performance of the database system.

3. The system of claim 1, wherein the at least one processor is configured to evaluate the one or more metrics associated with the resources to be used for creating the candidate index by determining in part, that one or more utilization metrics do not exceed respective threshold values.

4. The system of claim 3, wherein the one or more utilization metrics include a CPU utilization, a machine load, a cluster load, a collection size, a system memory utilization, and/or a time expected for creating the index.

5. The system of claim 1, wherein the at least one processor is configured to automatically create the candidate index using an automation agent.

6. The system of claim 1 further comprising a user interface configured to enable a user to enable/disable auto-index.

7. The system of claim 1, wherein the at least one processor is configured to:
    determine whether the candidate index to be created matches an index in an excluded list; and
    in response to determining that the candidate index matches an index in the excluded list, determine not to create the candidate index.

8. The system of claim 1, wherein the at least one processor when executing is configured to cause an automation agent to automatically create the candidate index in response to determining that the one or more criteria are met and to cause the automation agent to suspend automatically creating the candidate index in response to determining whether that creating the candidate index negatively impacts performance of the database system.

9. A computer implemented method for creating one or more indexes in a distributed database, the method comprising, by at least one processor:
    determining a candidate index to be created in the distributed database;
    evaluating one or more metrics associated with resources to be used for creating the candidate index to determine whether one or more criteria associated with creating the index are met;
    in response to determining that one or more criteria associated with creating the candidate index are met, automatically creating the candidate index in the distributed database; and
    before execution of operations to automatically create the candidate index:
        identifying one or more processes already in progress or going to be in progress at a start of the operations to automatically create the candidate index prior to automatically creating the candidate index;
        determining whether creating the index negatively impacts performance of the distributed database by determining whether creating the candidate index interferes with the one or more processes; and
        in response to determining that creating the candidate index negatively impacts performance of the distributed database including the one or more processes, suspending the start of the operations to automatically create the candidate index until the one or more processes are completed.

10. The computer implemented method of claim 9, wherein determining the candidate index to be created is performed based on one or more impact scores, each impact score associated with a respective impact on performance of the distributed database.

11. The computer implemented method of claim 9, wherein evaluating the one or more metrics associated with the resources to be used for creating the candidate index comprises determining in part that one or more utilization metrics do not exceed respective threshold values.

12. The computer implemented method of claim 11, wherein the one or more utilization metrics include a CPU utilization, a machine load, a cluster load, a collection size, a system memory utilization, and/or a time expected for creating the index.

13. The computer implemented method of claim 9, further comprising:
   determining, before automatically creating the candidate index in the distributed database, whether the candidate index to be created matches an index in an excluded list; and
   in response to determining that the candidate index matches an index in the excluded list, determining not to create the candidate index.

14. The method of claim 9, wherein automatically creating the candidate index and suspending automatically creating the candidate index are performed by an automation agent.

15. A non-transitory computer readable medium containing computer instructions that, when executed, will cause at least one processor to perform operations comprising:
   determining a candidate index to be created in a distributed database;
   evaluating one or more metrics associated with resources to be used for creating the candidate index to determine whether one or more criteria associated with creating the candidate index are met;
   in response to determining that one or more criteria associated with creating the candidate index are met, automatically creating the candidate index in the distributed database;
   before execution of operations to automatically create the candidate index:
      identifying one or more processes already in progress or going to be in progress at a start of the operations to automatically create the candidate index prior to automatically creating the candidate index;
      determining whether creating the index negatively impacts performance of the distributed database by determining whether creating the candidate index interferes with the one or more processes; and
      in response to determining that creating the candidate index negatively impacts performance of the distributed database including the one or more processes, suspending the start of the operations to automatically create the candidate index until the one or more processes are completed.

16. The non-transitory computer readable medium of claim 15, wherein the computer instructions for determining the candidate index to be created comprise computer instructions for determining the candidate index based on one or more impact scores, each impact score associated with a respective impact on performance of the distributed database.

17. The non-transitory computer readable medium of claim 15, wherein the computer instructions for evaluating the one or more metrics associated with the resources to be used for creating the candidate index comprise computer instructions for determining in part that one or more utilization metrics do not exceed respective threshold values.

18. The non-transitory computer readable medium of claim 17, wherein the one or more utilization metrics include a CPU utilization, a machine load, a cluster load, a collection size, a system memory utilization, and/or a time expected for creating the candidate index.

19. The non-transitory computer readable medium of claim 15, wherein the operations further comprise:
   determining, before automatically creating the candidate index in the distributed database, whether the candidate index to be created matches an index in an excluded list; and
   in response to determining that the candidate index matches an index in the excluded list, determining not to create the candidate index.

20. The non-transitory computer readable medium of claim 15, wherein automatically creating the candidate index and suspending automatically creating the candidate index are performed by an automation agent.

* * * * *